Nov. 7, 1950     W. B. POND     2,528,545
X-RAY RADIATION TIME RECORDER AND CONTROLLER
Filed May 19, 1946     3 Sheets-Sheet 1

WILLIAM B. POND,
INVENTOR.

BY

ATTORNEY.

Nov. 7, 1950  W. B. POND  2,528,545
X-RAY RADIATION TIME RECORDER AND CONTROLLER
Filed May 19, 1946  3 Sheets-Sheet 2

WILLIAM B. POND,
INVENTOR.

BY

ATTORNEY.

Nov. 7, 1950 W. B. POND 2,528,545
X-RAY RADIATION TIME RECORDER AND CONTROLLER
Filed May 19, 1946 3 Sheets—Sheet 3

WILLIAM B. POND,
INVENTOR.

BY

ATTORNEY.

Patented Nov. 7, 1950

2,528,545

UNITED STATES PATENT OFFICE 2,528,545

X-RAY RADIATION TIME RECORDER AND CONTROLLER

William B. Pond, Arcadia, Calif., assignor to Transresearch of California, Pasadena, Calif., a partnership Application March 19, 1946, Serial No. 655,444

12 Claims. (Cl. 250—95)

This invention relates generally to a recording and control apparatus and more specifically to a radiation exposure time recording and control apparatus which might, for example, be used to record and control the exposure time to X-rays of a physician, operator, patient, or other person who might be exposed. While the apparatus is primarily intended for medical use, it might also be used industrially, or in many other applications.

There are numerous automatic X-ray timers well known in the prior art. However, such timers are generally of the type which automatically turns off the X-ray generator after a predetermined or preselected time interval and are intended for use with an X-ray generator adapted to expose a photographic medium such as plates, film, etc. Since the purpose of such X-ray apparatus is to make X-ray films, the exposure time is relatively short and is of the order of seconds generally.

In the use of such prior art automatic X-ray timers, the physician or operator of the X-ray apparatus first positions the patient or other object to be exposed to X-rays, then the operator measures the distance through the object to be traversed by the X-rays in a direction parallel to the passage of the X-rays through the person or object, then takes into account the density of the medium to be traversed by the X-ray and keeping the above points in mind, the operator makes appropriate settings of the kilovolts across the X-ray generator tube and the milliamperes through the filament of the X-ray generator tube. Since both the adjustment of the kilovolts across the tube and the milliamperes through the filament affect the quantity and intensity of the X-rays generated, the optimum exposure time for a photographic medium such as plate, film, etc., which is placed on the opposite side of the object or person to be photographed, will be a function of said kilovolt adjustment, said milliampere adjustment, the density and thickness of the person or object to be traversed by the X-rays and the distance between the X-ray generator and the photographic medium. Keeping the above points in mind, the physician or operator determines the correct exposure time for the photographic medium and sets the automatic X-ray timer so as to shut off the X-ray generator at the end of such exposure time. Such prior art, automatic X-ray timers function admirably where the X-ray generator is adapted to expose a photographic medium.

However, such prior art, automatic X-ray exposure time apparatus are almost completely useless in fluoroscopy. In fluoroscopy the physician or operator positions the patient or object to be examined between an X-ray generator and a fluorescent screen which generally comprises any suitable transparent material coated with any suitable fluorescent material such as barium platinocyanide or zinc sulfide. The patient or object to be examined casts shadows on said fluorescent screen which may be visually observed by the physician or operator of the X-ray apparatus.

In fluoroscopy it is often desirable to examine the object for a period of time, shut off the X-ray generator, reposition the object to be examined, turn on the X-ray generator again, and examine the object or patient a second time. This intermittent operation may be repeated many times and the elapsed time of each exposure is determined by the physician or the operator of the X-ray generator, generally by means of a foot switch which is depressed by the physician or operator when it is desired to examine the patient and which is released when it is desired to stop the examination, either momentarily or otherwise. Since over-exposure to X-rays will seriously harm a human being, it is essential that some means of recording and integrating the total elapsed time of all of the various exposures be provided which will also automatically shut off the X-ray generator after such integral or total time of such exposures exceeds a predetermined, safe value which is well within the same range.

There has been need for such an exposure time recording and control device for recording and controlling exposure time of gamma radiation widely used in industrial applications. There has also been need of such an exposure time recording and control device for recording and controlling exposure time to ultra-violet radiation, to infra-red radiation, and, in fact, to any radiation, an excess of which may be harmful to human beings. There has also been need for a simple, fool-proof, integrating and recording apparatus adapted to integrate and record electrical surges. There has been need for a simple, cheap, fool-proof apparatus which will integrate and record the length of time during which any condition departs from a predetermined norm.

It would be of great advantage to have an X-ray exposure time recording apparatus adapted for medical use which would provide an individual record of the total elapsed exposure time of each individual patient.

With the above points in mind, it is an object of this invention to provide a radiation exposure time recording apparatus adapted to integrate and record the total elapsed time during which a radiation generator is operating.

It is a further object of this invention to provide a radiation exposure time control apparatus adapted to automatically shut off a radiation generator after the total operation time of said radiation generator has reached a predetermined value.

It is a further object of the present invention to provide a radiation exposure time control apparatus adapted to flash on a warning light after a total period of operation time of said radiation generator has reached a predetermined value.

It is a further object of the present invention to provide a recording apparatus adapted to integrate and record the total elapsed time of electrical overloads or surges, as for example, in a power line, etc.

It is a further object of the present invention to provide a recording apparatus adapted to integrate and record the total elapsed time during which a physical condition has departed from a predetermined norm.

It is a further object of this invention to provide an X-ray exposure time recording and control apparatus primarily adapted for use in fluoroscopy for integrating and recording the total elapsed exposure time to X-rays and for automatically shutting off the X-ray generator after a predetermined, total time.

It is a further object of the present invention to provide an X-ray exposure time recording apparatus adapted for medical use which will provide an individual record of the total exposure time of each individual patient.

It is a further object of this invention to provide an X-ray exposure time recording apparatus adapted for medical use which will provide an individual record of the total exposure time of each individual patient and which will also provide a record of the exposure time of each individual incremental exposure comprising a part of said total exposure time.

Referring to the drawings.

Figure 1:
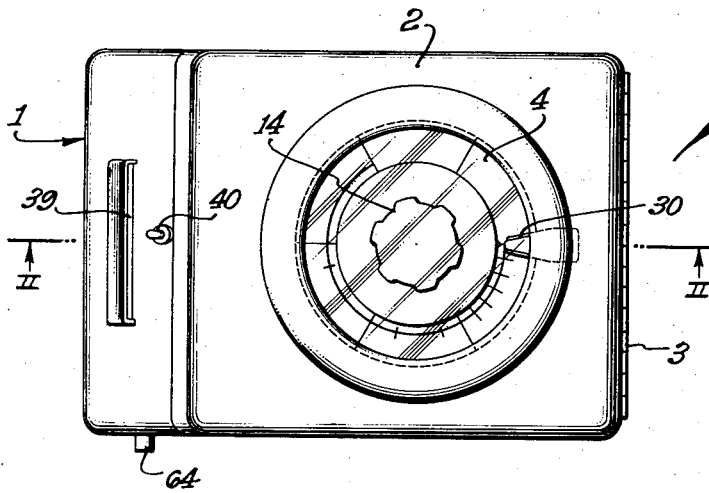
Fig. 1 is a top view of my invention mounted in a cabinet.

Generally speaking, one embodiment of my invention comprises a cabinet or other suitable housing provided with a suitable hinged door which opens upwardly to permit access to a record chart within the housing. Within the housing there is a recording carriage, such as a disc, adapted to receive and carry a record chart, the carriage being driven by a synchronous or other constant speed motor. Selectively operable means are provided for holding a markable chart upon the carriage, and such means may cooperate with a switch to interrupt a primary circuit (connected to or controlling a source of radiation) when attempt is made to remove the chart.

A frame or carriage carrying a pencil, pen, scribe, stylus, voltage-carrying stylus, or the like, is mounted for movement with the recording carriage. Means are provided for arresting and immobilizing the stylus carriage and thereby attaining relative, recording motion between stylus and chart when the source of radiation is being used.

The device also includes a timing motor and suitable circuit operable by a cam driven thereby, the circuits warning the operator when a predetermined total time of radiation has transpired, even though such total time is the summation of a number of shorter time increments. Means are also provided for energizing the timing motor only when the stylus is recording, and for returning the timing cam to original position when, prior to the expiration of the predetermined total permissive time of radiation, the operator desires to remove the chart.

More specifically, the embodiment illustrated shows the upper surface of cabinet 1 provided with a door 2 hinged at 3. The center portion of the door 2 is provided with a transparent window 4. A supporting member 5 is mounted in any suitable manner upon the base 6 of the cabinet.

A hollow shaft 8 is rotatably mounted or journaled in the upwardly extending portion 9 of the supporting member 5. A circular, disc-shaped member 10 (record chart carriage) is fixedly mounted on the upper end of the hollow shaft 8 so as to be driven thereby. The member 10 is provided with upwardly extending locating pins 11 and 12. The exterior surface of the upper end of the rotatable shaft is threaded at 13. A manually operable chart-holding or clamping means 14 is interiorly threaded at 15, said threads cooperating with the exterior threads 13 on the upper end of the hollow shaft 8. A longitudinal, switch-actuating member 7 is mounted within and coaxial with the hollow shaft 8. The upper end of said switch-actuating member 7 abuts the interior surface of the clamping means 14. The lower end of said switch-actuating member 7 abuts and actuates an electrical switch 42, normally holding this switch in open position.

A synchronous or constant speed motor 16 is also mounted on the supporting member 5 for rotating the hollow shaft 8, disc member 10, and clamping means 14 through reduction gearing indicated generally at 17 when said motor 16 is energized. The lower surface of an annular ring 18 frictionally engages the upper surface of an annular lip portion 19 of the member 10 so as to be driven thereby. Spring members 20 may be fixed to the annular ring 18 so as to be in opposition to the annular member 18 on the opposite side of lip 19 from the annular member 18 for maintaining frictional engagement between said annular member 18 and the annular lip 19 of the circular disc member 10. An annular ring 21 is fixed to the annular member 18.

Figure 2:
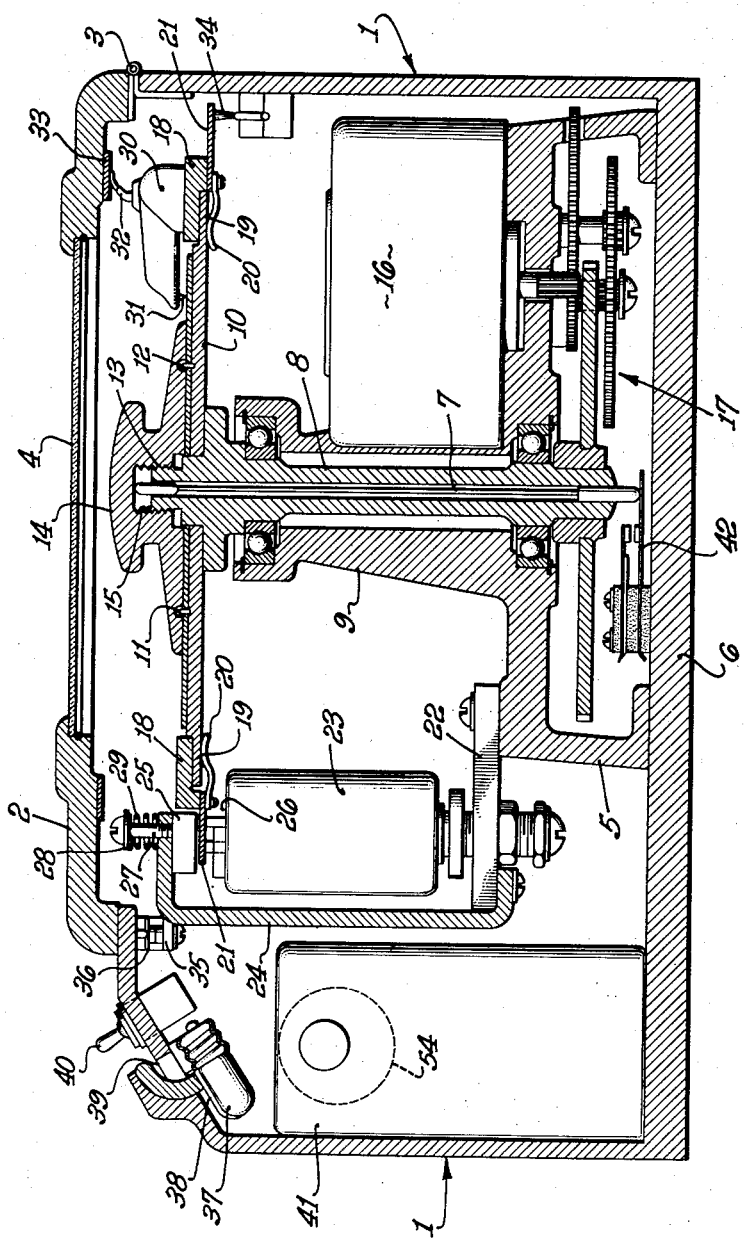
Fig. 2 is a front sectional view of Fig. 1 taken along plane II—II.
Figure 5:
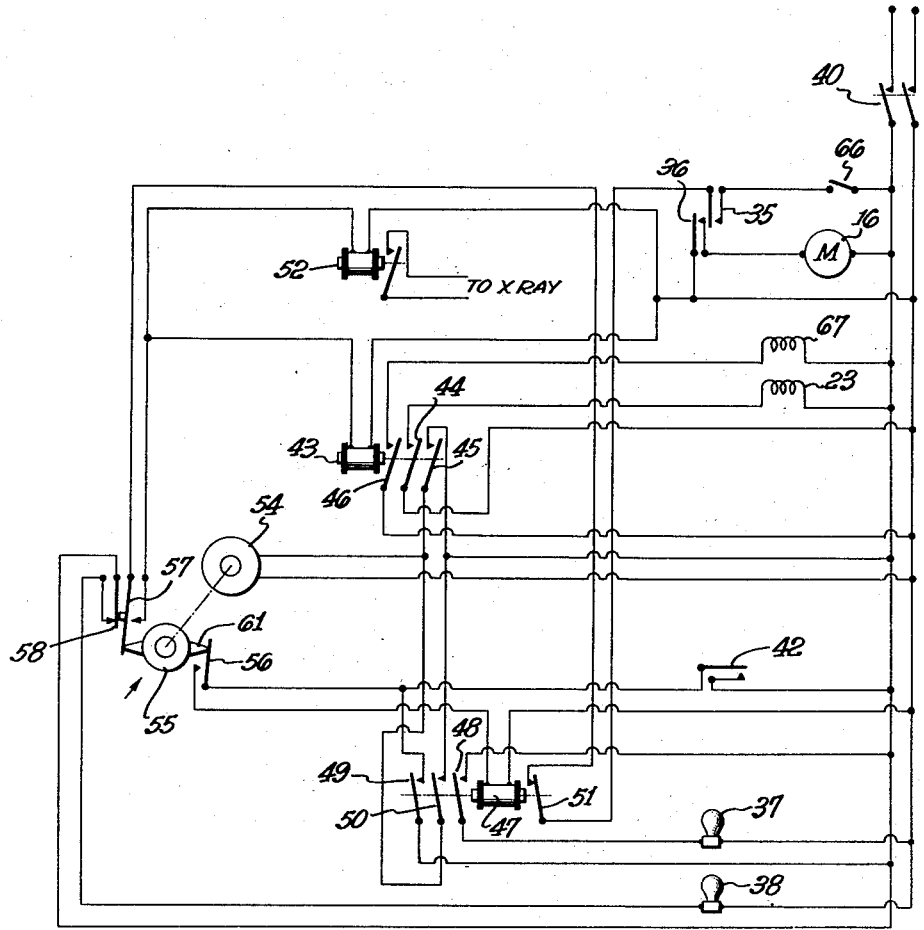
Fig. 5 is an electrical schematic diagram of my invention so arranged as to bring out and emphasize the operating relationship between the various components thereof.
Figure 6:
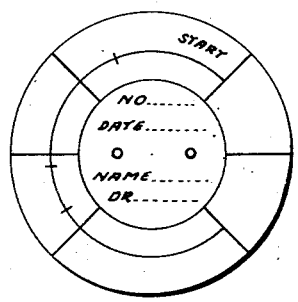
Fig. 6 is a plan view of a record-receiving card as it appears after receiving markings from a recording stylus.

A supporting member 22 is fixed to the supporting member 5 and supports an electromagnet 23 in a vertical position. A supporting member 24 is fixed to the supporting member 22. Said supporting member 24 extends in a vertical direction parallel to the electromagnet 23 and the upper end of said supporting member 24 bends laterally so as to pass across the pole face 26 of the electromagnet 23. The armature 25 of the electromagnet 23 rests against the inner lower face of said supporting member 24, as viewed in Fig. 2, in opposition to and spaced from the pole face 26 of the electromagnet 23. Said armature 25 is connected to a retaining pin 27 which passes through the supporting member 24. The outer end of the retaining pin 27 has a retaining member or collar 28 thereon. A coil compression sping 29 is mounted between the retaining member 28 and the supporting member 24 so as to spring bias the armature 25 in an upward direction and maintain said armature 25 at a spaced distance away from the pole face 26 of the electromagnet 23 until said electromagnet 23 is energized. When said electromagnet 23 is energized, the armature 25, retaining pin 27 and retaining collar 28 move in a downward direction against the force exerted by the spring 29 and abut the annular ring 21, thus fixedly locking said annular rings 21 and 18 from rotation.

A stylus holder or carriage 30 is mounted on the upper surface of annular ring 18, said stylus holder 30 carrying a suitable stylus, recording pen, or scribe, etc. of any of the types well known in the art. The stylus holder 30 is of the type which allows movement of the stylus 31 so that the stylus 31 and stylus holder 30 may be manually picked up and removed from the recordable medium so that said recordable medium may be removed from the circular disc member 10 when so desired. Said stylus holder 30 has mounted thereon a stylus-actuating solenoid 67, for actuating or moving said stylus and stylus holder radially with respect to the circular disc member 10. A brush 32 contacts a circular, electrically conductive member 33 which is connected to a suitable source of electrical power through power supply switch 40 and annular member 21 contacts brush member 34 which is connected to switch 46, power supply switch 40 and the electrical power source. The stylus-actuating solenoid 67 which is contained within the stylus holder 30 is electrically connected to the brush 32 and the annular ring 21 for actuating the same upon energization.

Switches 35 and 36 are mounted on the wall of the cabinet 1 so that when the door 2 is opened said switches will also be opened and when the door 2 is closed said switches will be closed.

Warning lights 37 and 38 are so mounted within the cabinet with relation to an opening 39 in the cabinet 1 that they may be observed from the outside of the cabinet 1. A power supply switch 40 is mounted in the wall of the cabinet 1 adjacent the orifice 39 with the switch portion projecting through the wall of the cabinet 1 so that said switch 40 may be actuated from outside of the cabinet.

A control box 41 is mounted on the base of the cabinet. Said control box 41 contains a relay or solenoid coil 43 and normally open switches 44, 45, and 46 which are closed by said relay coil 43 when energized. Said control box 41 also contains a relay or solenoid coil 47 which closes normally open switches 48, 49, and 50 and opens normally closed switch 51 simultaneously. The control box 41 also contains relay or solenoid coil 52 which closes a normally open switch not shown for closing the electrical circuit to an X-ray generator, not shown. The control box 41 also contains a synchronous or other constant speed time control motor 54 and cam 55 which opens normally closed switches 56 and 57 and which closes normally open switch 58 simultaneously. The time control motor 54 drives a shaft 59 which has keyed thereon the cam 55 by means of a key 60. The cam 55 is slidably mounted on the shaft 59. The cam 55 is provided with projections 61 which will abut and actuate switch-actuating members 62 and 63 twice during each complete revolution of cam 55. The switch-actuating member 62, when abutted by the projections 61 on cam 55, closes switch 58 and opens switch 57. The switch-actuating member 63, when abutted by the projections 61 on the cam 55, opens switch 56. All of the above-mentioned switch opening or closing actions take place simultaneously.

Figure 3:
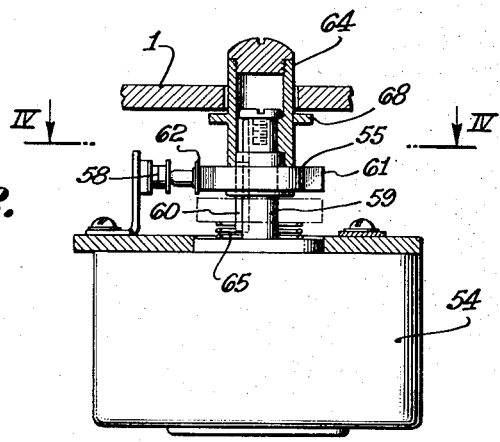
Fig. 3 is a front view of the timing control means of my invention.

A manually operable, hollow, tubular, cam-overriding member 64 which is provided with a closed outer end is mounted in a hole in the wall of the cabinet 1 and is retained therein by a circumferential lip 68. Said member 64 is loosely fitted over the outer end of the shaft 59 of the time control motor 54 and abuts the upper surface of the cam 55 as viewed in Fig. 3. Said tubular member 64 may be manually depressed so as to slide the cam 55 downwardly on the shaft 59 so that the projections 61 on the cam 55 will no longer actuate switch-actuating members 62 and 63 but will be held in this lowered position by means of the projections 61 engaging the under surfaces of the switch-actuating members 62 and 63. The cam 55 will be held in this depressed position until sufficient rotation of the cam has taken place to cause the projections 61 to clear the switch-actuating members 62 and 63, at which time a spring 65 will return the cam 55 to its normal position.

Whenever the power supply switch 40 is closed and the door 2 is closed, thus closing the door-actuated switch 36, which closes the circuit to the constant speed disc-driving motor 16, the motor 16 rotates the circular disc member 10, the recordable medium carried by said disc member 10, and the frictionally engaged, annular ring 18 and attached annular ring 21. Thus no relative motion takes place between the stylus 31 carried by stylus holder 30 which is mounted on the annular ring 18 and the recordable medium carried by the circular disc member 10. However, whenever the electromagnet 23 is energized, the armature 25 frictionally engages the annular ring member 21 overriding the frictional engagement between the circular disc member 10 and the annular ring 18 and thus prevents any rotation of the annular ring member 21, the annular ring member 18, and the stylus holder 30 which is mounted therein. Since, under this condition, the circular disc member 10 continues to rotate while the annular rings 21 and 18 and attached stylus holder 30 are locked in a stationary position, relative movement takes place between the stylus 31 and the recordable medium carried by the circular disc member 10 during the period of energization of said electromagnet 23.

The normal operation of the device is as follows: The physician or operator of the apparatus closes power supply switch 40, depresses the cam-overriding member 64 and closes a normally open foot switch 66. If the door-actuated switch 35 is closed, which condition will exist if the door 2 is closed, and if switch 51 is closed, which it normally is, and if the contact 57 is closed, which it normally is, the relay or solenoid coil 52 and the relay or solenoid coil 43 will be energized simultaneously. Said relay or solenoid coil 52 will close the normally open, X-ray power supply switch which will cause the X-ray generator or source of radiation to begin operation. Said relay or solenoid coil 43 will simultaneously close normally open switches 44, 45, and 46. The closing of the switch 44 will energize the electromagnet 23 which will lock the annular rings 21 and 18 and the stylus holder 30 and stylus 31 mounted thereon from rotation, and since the door-actuated switch 36 is closed by the door 2 thus causing constant speed, disc driving motor 16 to rotate the circular disc member 10 and the recordable medium mounted thereon with respect to the stationary stylus 31, said recordable medium is recorded by means of said stylus 31 for the period of energization of the X-ray generator. The closing of the switch 45 will close the circuit to the time control motor 54, starting rotation of the same. The closing of switch 46 will close the circuit to the stylus-actuating solenoid 67 contained in the stylus holder 30 and will radially, outwardly actuate and hold said stylus holder 30 and said stylus 31 during the period of energization of the X-ray generator. If the foot switch 66 is released, all of the above actions cease. The foot switch 66 may be of the type which, when depressed and closed, locks itself until further actuation for releasing it takes place, if so desired.

After the foot switch 66 is closed and the above-described action takes place, time control motor 54 rotates the cam 55 until such time as the projections 61 actuate switch-actuating members 62 and 63, thus automatically shutting off the X-ray generator at the end of a 180° rotation of the cam 55. At such time after the cam 55 has rotated 180° and has actuated members 62 and 63 and stopped the action of the X-ray generator, the tubular member 64 may be manually depressed, thus moving the cam 55 and projections 61 below the plane of the switch-actuating members 62 and 63, thus allowing the switches 56 and 57 to close and switch 58 to open and the X-ray generator will again start and the whole above-described operation will be repeated. The switch 58, which is closed whenever the switches 51 and 56 are open, closes the electrical circuit to a red warning light 38 so that whenever the cam 55 has gone through a 180° rotation and the projections 61 open the switches 46 and 57 and close the switch 58, the red warning light gones on, warning the operator that the operation has terminated and that resetting of the cam 55 by means of the tubular member 64 is necessary if further operation of the device is desired.

Figure 4:
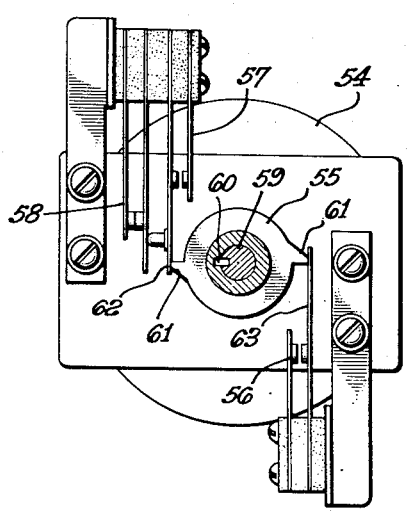
Fig. 4 is a top sectional view taken along plane IV—IV of Fig. 3.

Following the above operations through step by step: after the foot switch 66 is closed and the before-described action takes place, the time control motor 54 rotates the cam 55 through 180° or until such time as the projections 61 on said cam 55 actuate switch-actuating members 62 and 63 which will simultaneously open normally closed switches 56 and 57 and close normally open switch 58. The opening of said switch 57 breaks the circuit to the relay or solenoid coils 43 and 52. The deenergizing of the relay or solenoid coil 52 allows normally an open, X-ray power supply switch, not shown, to open, thus causing the X-ray generator to cease operation. The deenergizing of the relay or solenoid coil 43 allows normally open switches 44, 45, and 46 to open. The opening of said switch 44 breaks the circuit to the electromagnet 23, thus releasing annular rings 21 and 18 and stylus holder 30 mounted thereon which causes the recording by the stylus 31 of the recordable medium carried on the rotating, circular disc member 10 to cease. The opening of said switch 45 breaks the circuit to the cam-driving, timing motor 54, causing it to stop with the cam 55 positioned as shown in Fig. 4, which I call "home" position. The opening of the switch 46 breaks the circuit to stylus-actuating solenoid 67, allowing spring means, not shown, to move the stylus holder 30 and stylus 31 in a radial, inward direction with respect to the circular disc member 10 and the recordable medium carried thereon, thus marking the beginning and the end of each individual recording period on said recordable medium.

The above-mentioned cam-actuated closing of the normally open switch 58, when the cam 55 reaches "home" position, closes the circuit to a red warning light 38 which warns the physician or operator of the X-ray apparatus that the predetermined total exposure time interval has passed and that the cam 55 has reached "home" position, as shown in Fig. 4. The above-mentioned cam-actuated opening of the normally closed switch 56, when the cam 55 reaches "home" position, has no effect under the above conditions.

The above description is true if the total elapsed exposure time comprises one continuous exposure or a plurality of small, incremental exposures, provided that the examination is not concluded and the recorded medium is not removed before the cam 55 reaches "home" position.

If the foot switch 66 is released before the cam 55 has gone through a 180° rotation, or before the cam 55 has reached "home" position, and the projections 61 have actuated the switch-actuating members 62 and 63, the switch 56 will be closed, and if at such time the clamping means 14 which threadably engages the upper end of the rotatable shaft 8 for clamping a recordable medium on the circular disc member 10 is removed, the switch 42 is also closed, thus closing the electrical circuit to a relay or solenoid coil 47 which, in turn, will open the normally closed switch 51 which deenergizes the solenoid or relay coil 52, thus allowing the normally open, X-ray power supply switch to open, thus interrupting the operation of the X-ray generator. The relay or solenoid coil 47, simultaneously with the opening of the switch 51, will close the switch 50, which will close the circuit to time control motor 54, thus causing said time control motor to rotate until the projections 61 contact and actuate the switch-actuating members 62 and 63 which will open the switch 56, thus breaking the circuit to the relay or solenoid coil 47. Simultaneously to the opening of the switch 51 and the closing of the switch 50, switches 49 and 48 are also closed. The switch 49 acts as a shunt around the switch 42 so that even when the clamping means 14 is screwed down on the upper end of the hollow shaft 8, thus causing the switch-actuating member 7 to open the switch again, current will still be supplied to relay or solenoid coil 47 as long as switch 56 is open, or, in other words, until the time control motor has rotated the cam 55 and projection 61 to the position shown in Fig. 4, which we will call "home" position. The switch 48, which closes at the same time the switch 51 opens and switches 50 and 49 close, closes the electrical circuit to yellow warning light 37, which warns the operator of the device that the cam 55 is not in "home" position, as shown in Fig. 4. As soon as said cam 55 has reached "home" position, as shown in Fig. 4, the yellow warning light will go out, since the opening of the switch 56 will have broken the circuit to the relay coil 47.

Following the above operations through step by step: if the physician or operator desires to conclude the X-ray examination and remove the recordable medium from the machine before the predetermined time interval has passed or before the cam 55 reaches "home" position, the above-referred to, normally closed, cam-actuated switch 56 is closed and when the retaining, clamping member 14 is also unscrewed from the upper end of the hollow shaft 8 for removing the recorded medium from the upper surface of the circular disc member 10, the normally closed switch 42 is allowed to close, thus closing a circuit through said switches 56 and 42 to a relay or solenoid coil 47. The energization of said relay or solenoid coil 47 simultaneously closes normally open switches 48, 49, and 50 and opens normally closed switch 51. The closing of said normally open, holding switch 49 shunts or by-passes the switch 42 and acts to keep the circuit to said relay or solenoid coil 47 closed entirely independently of the switch 42 provided that the cam-actuated switch 56 is closed. In other words, it is necessary to have both the cam 55 in a position other than "home" position, thus allowing switch 56 to close, and to remove the retaining, clamping member 14, thus also closing switch 42 in order to initially energize the relay or solenoid coil 47. But once said relay or solenoid coil 47 is energized, the clamping means 14 may or may not be replaced, or switch 42 may or may not be opened or closed without having the slightest effect on relay or solenoid coil 47. Said relay 47 will be deenergized when the cam 55 reaches "home" position and the projections 61 on said cam 55 actuate switch-actuating means 63, thus opening cam-actuated switch 56 and breaking the circuit to said relay or solenoid coil 47.

The before-mentioned closing of said normally open switch 48 by relay or solenoid coil 47 closes the circuit to the yellow warning light 37 and warns the physician or operator of the apparatus that the rotating cam 55 has not yet reached "home" position. The before-mentioned closing of the normally open switch 50 by the relay or solenoid coil 47 closes the circuit to the cam-driving timing motor 54 for returning the cam 55 to "home" position. The before-mentioned opening of normally closed switch 51 by said relay or solenoid coil 47 opens the circuit to relay or solenoid coils 43 and 52. The deenergizing of the relay or solenoid coil 43 allows normally open switches 44, 45, and 46 to open. The opening of switch 44 breaks the circuit to electromagnet 23, thus stopping the recording by the stylus 31 of the recordable medium as hereinbefore explained. The opening of the switch 45 has no effect, since said switch 45 is shunted by switch 50 which is closed under this condition. The opening of switch 46 breaks the circuit to the stylus-actuating solenoid 67, thus allowing spring means, not shown, to radially, inwardly move said stylus 31 a short distance with respect to circular disc member 10. The before-mentioned opening of the circuit to said relay or solenoid coil 52 deenergizes the same and allows the normally open X-ray power supply switch to open, thus causing the X-ray generator to cease operating.

The opening or closing of the door 2 actuates switches 35 and 36, the opening of the door opening the switches and the closing of the door closing the switches. The opening of the door 2, thus opening the switch 35, will stop the X-ray generator regardless of all other switches or mechanism, and the closing of the door 2 will place the device in condition for operation again. The opening of the door 2 opens the switch 36 which closes the circuit to the synchronous or constant speed motor 16 which rotates the circular disc member 10, and when the door 2 is opened, the motor 16 stops, thus making it possible to unscrew the clamping means 14 from the end of the hollow shaft 8 and remove the recordable medium from the upper surface of the circular disc member 10.

It is to be clearly and distinctly understood that the stylus-actuating solenoid 67, which is contained in the stylus holder 30, may be eliminated and not affect the function of the device. The circuit can readily be rearranged so as to eliminate the yellow warning light 37 and red warning light 38 and associated switches 48 and 58 without affecting the function of the device.

The apparatus in modified form may be used in electrical overload or surge recording or for recording the length of time of departure of any physical condition from a predetermined norm. This can be accomplished by eliminating all elements of the apparatus other than the synchronous, disc-driving motor, reduction gearing, shaft, circular disc member adapted to carry a recording medium, stylus and stylus holder, the annular member which is in engagement with the outer edge of the circular member, the armature which locks the annular member against rotation and electromagnetic means for actuating the armature so as to lock the annular member against rotation while allowing rotation of the circular disc member. Suitable switch means will be provided, of course.

The electromagnetic means mentioned might be an overload relay which acts only on electrical surges or overloads, thus allowing relative movement between the stylus and recordable medium only during the period of time of such surges or overloads. Or such electromagnetic means might be differential relays which are actuated by an electrical current which departs in either direction from the norm, said electrical current being responsive to the physical condition which it is desired to keep track of.

Numerous other modifications of this principle will suggest themselves to those skilled in the art. The example given is for illustrative purposes only and I do not desire to limit myself to the example shown. My invention is to be limited only by the scope of the claims appended hereto.

I claim:

1. A radiation time recording and control apparatus comprising: a normally rotatable annular member; recording stylus means mounted on said annular member; rotatable disc means adapted to carry a removable record-receiving medium for recording cooperation with said recording stylus means, a portion of said disc means being in spring-pressed, frictional, rotative driving engagement with said annular member; constant speed motor means for rotating said disc means and said annular member; locking means for locking said annular member against rotation during the period of radiation, thereby relatively to move said stylus and a record-receiving medium carried by said disc; timing motor means; and cam means driven by said timing motor means adapted to shut off the source of radiation after a predetermined time interval.

2. A radiation time recording and control apparatus comprising: a normally rotatable annular member; recording stylus means mounted on said annular member; rotatable disc means adapted to carry a removable record-receiving medium for cooperation with said recording stylus means, a portion of said disc means being in spring-pressed, frictional rotatable driving engagement with said annular member; constant speed motor means for rotating said disc means and said annular member; locking means for locking said annular member against rotation during the period of radiation, thereby to move said disc and a movable record-receiving medium carried thereby relatively to said stylus; and timing means adapted to shut off the source of radiation and unlock said locking means after a predetermined time interval.

3. A recording apparatus comprising: a normally rotatable, annular member; recording stylus means mounted on said annular member; rotatable disc means adapted to carry a removable record-receiving medium for cooperation with said recording stylus means, a portion of said disc means being in spring-pressed, frictional engagement with said annular member; constant speed motor means for rotating said disc means; and locking means for locking said annular member against rotation during the recording period.

4. In an apparatus for recording the extent of use and limiting the use of a source of radiation, including a motor-driven recording carriage and means for holding a record chart on said carriage: a timing motor provided with a cam; a separate circuit including an electrically operated switch for energizing a source of radiation; a stylus carriage normally movable with the recording chart carriage; a primary circuit including a switch operable by the cam, said switch being open when the cam is in home position, operably connected to the electrically operated switch; means rendered operable by closure of the cam-operated switch to arrest the stylus and to energize the timing motor; and manual switch means in the primary circuit for controlling the operation of the electrically controlled switch while the cam-operated switch is closed.

5. In an apparatus for recording the extent of use and limiting the use of a source of radiation, including a motor-driven recording carriage and means for holding a record chart on said carriage: a timing motor provided with a cam; a separate circuit including an electrically operated switch for energizing a source of radiation; a stylus carriage normally movable with the recording chart carriage; a primary circuit including a switch operable by the cam, said switch being open when the cam is in home position, operably connected to the electrically operated switch; manual means for closing the cam-operated switch; means rendered operable by closure of the cam-operated switch to arrest the stylus and to energize the timing motor; and manual switch means in the primary circuit for controlling the operation of the electrically controlled switch while the cam-operated switch is closed.

6. In an apparatus for recording the extent of use and limiting the use of a source of radiation, including a motor-driven recording carriage and means for holding a record chart on said carriage: a timing motor provided with a cam; a separate circuit including an electrically operated switch for energizing a source of radiation; a stylus carriage normally movable with the recording chart carriage; a primary circuit including a switch operable by the cam, said switch being open when the cam is in home position, operably connected to the electrically operated switch; manual means for closing the cam-operated switch; means rendered operable by closure of the cam-operated switch to arrest the stylus and to energize the timing motor; manual switch means in the primary circuit for controlling the operation of the electrically controlled switch while the cam-operated switch is closed; and means for interrupting the primary circuit when the chart holding means is released.

7. In an apparatus for recording the extent of use and limiting the use of a source of radiation, including a motor-driven recording carriage and means for holding a record chart on said carriage: a timing motor provided with a cam; a separate circuit including an electrically operated switch for energizing a source of radiation; a stylus carriage normally movable with the recording chart carriage; a primary circuit including a switch operable by the cam, said switch being open when the cam is in home position, operably connected to the electrically operated switch; manual means for closing the cam-operated switch; means rendered operable by closure of the cam-operated switch to arrest the stylus and to energize the timing motor; manual switch means in the primary circuit for controlling the operation of the electrically controlled switch while the cam-operated switch is closed; and means for supplying energy to the timing motor to return the cam to home position when the chart holding means is released.

8. In an apparatus for recording the extent of use and limiting the use of a source of radiation, including a motor-driven recording carriage and means for holding a record chart on said carriage: a timing motor provided with a cam; a separate circuit including an electrically operated switch for energizing a source of radiation; a stylus carriage normally movable with the recording chart carriage; a primary circuit including a switch operable by the cam, said switch being open when the cam is in home position, operably connected to the electrically operated switch; means rendered operable by closure of the cam-operated switch to arrest the stylus and to energize the timing motor; manual switch means in the primary circuit for controlling the operation of the electrically controlled switch while the cam-operated switch is closed; and means for supplying energy to the timing motor to return the cam to home position when the chart holding means is released.

9. In an apparatus for recording the extent of use and limiting the use of a source of radiation, including a motor-driven recording carriage and means for holding a record chart on said carriage: a timing motor provided with a cam; a separate circuit including an electrically operated switch for energizing a source of radiation; a stylus carriage normally movable with the recording chart carriage; a primary circuit including a switch operable by the cam, said switch being open when the cam is in home position, operably connected to the electrically operated switch; manual means for closing the cam-operated switch; means rendered operable by closure of the cam-operated switch to arrest the stylus and to energize the timing motor; manual switch means in the primary circuit for controlling the operation of the electrically controlled switch while the cam-operated switch is closed; means for interrupting the primary circuit when the chart holding means is released; and means for supplying energy to the timing motor to return the cam to home position when the chart holding means is released.

10. A radiation time recording and control apparatus comprising: a pair of concentrically related rotatable members, one of said members being arranged to carry a record-receiving medium and the other carrying a recording stylus; a constant speed motor operably connected to drive one of said members; means normally holding said pair of members in engagement for simultaneous, non-recording rotation; and locking means for immobilizing one of said members during a period of radiation while the other member is rotated, to record duration of such period by the stylus upon a record-receiving medium.

11. A radiation time recording and control apparatus comprising: a pair of concentrically related rotatable members, one of said members being arranged to carry a record-receiving medium and the other carrying a recording stylus; a constant speed motor operably connected to drive one of said members; means normally holding said pair of members in engagement for simultaneous, non-recording rotation; locking means for immobilizing one of said members during a period of radiation while the other member is rotated, to record duration of such period by the stylus upon a record-receiving medium; a timing motor; and a circuit including means arranged to close a power circuit to a source of radiation to energize the timing motor and to energize said locking means simultaneously, said timing motor being operably associated with switch means for breaking said circuit upon expiration of a predetermined time.

12. A radiation time recording and control apparatus comprising: a rotatable stylus carriage including means for carrying a recording stylus; a rotatable member arranged for rotation concentrically with said stylus carriage, said rotatable member being arranged to carry a record-receiving medium in cooperative relation to the stylus on said carriage; means normally maintaining said stylus carriage and rotatable member is engagement for simultaneous, non-recording rotation; constant speed motor means for driving said rotatable member; electromagnetic locking means for immobilizing the stylus carriage during the period of radiation to produce relative recording rotation between the stylus carriage and rotatable member; timing motor means; and cam means driven by the timing motor means and arranged to shut off the source of radiation after a predetermined time interval.

WILLIAM B. POND.

REFERENCES CITED

The following references are of record in the file of this patent:

UNITED STATES PATENTS

| Number | Name | Date |
|---|---|---|
| 1,877,260 | Wantz | Sept. 13, 1932 |
| 2,091,697 | Wolf | Aug. 31, 1937 |
| 2,126,957 | Goldfield | Aug. 16, 1938 |
| 2,351,486 | Constable et al. | June 13, 1944 |
| 2,353,980 | Weisglass | July 18, 1944 |

FOREIGN PATENTS

| Number | Country | Date |
|---|---|---|
| 586,532 | Germany | Apr. 20, 1929 |